US011497294B2

(12) United States Patent
Wilke

(10) Patent No.: US 11,497,294 B2
(45) Date of Patent: Nov. 15, 2022

(54) DEVICE FOR A CARRYING BELT SYSTEM FOR A RESPIRATOR, PADDING DEVICE, CARRYING BELT SYSTEM AND RESPIRATOR

(71) Applicant: Dräger Safety AG & Co. KGaA, Lübeck (DE)

(72) Inventor: Bastian Wilke, Lübeck (DE)

(73) Assignee: DRÄGER SAFETY AG & CO. KGAA, Lübeck (DE)

(*) Notice: Subject to any disclaimer, the term of this patent is extended or adjusted under 35 U.S.C. 154(b) by 400 days.

(21) Appl. No.: 16/795,182

(22) Filed: Feb. 19, 2020

(65) Prior Publication Data

US 2020/0178676 A1 Jun. 11, 2020

Related U.S. Application Data

(62) Division of application No. 15/477,305, filed on Apr. 3, 2017, now Pat. No. 10,602,832.

(51) Int. Cl.

| | |
|---|---|
| ***A45F 3/12*** | (2006.01) |
| ***B29C 44/18*** | (2006.01) |
| ***B29D 99/00*** | (2010.01) |
| ***A45F 3/00*** | (2006.01) |
| ***A62B 25/00*** | (2006.01) |

(Continued)

(52) U.S. Cl.

CPC ................ *A45F 3/12* (2013.01); *A45F 3/005* (2013.01); *A62B 25/00* (2013.01); *B29C 44/18* (2013.01); *B29C 45/14622* (2013.01); *B29C 57/10* (2013.01); *B29C 71/02* (2013.01); *B29D 99/0092* (2013.01); *A45F 2003/127* (2013.01); *B29C 44/08* (2013.01); *B29K 2067/00* (2013.01); *B29K 2075/00* (2013.01); *B29K 2105/04* (2013.01); *B29L 2009/00* (2013.01); *B29L 2022/00* (2013.01); *B29L 2031/58* (2013.01)

(58) Field of Classification Search

CPC .... A45F 5/021; A45F 3/12; A45F 5/02; A45F 2003/144; A45F 2003/127; A62B 25/00; A62B 9/04

USPC ................ 224/642–643, 662, 264, 663, 665; 24/324, 578.13, 581.1, 594.11, 595.1

See application file for complete search history.

(56) References Cited

U.S. PATENT DOCUMENTS

| | | | | |
|---|---|---|---|---|
| 414,916 A * | 11/1889 | Nelson | A45F 3/12 | 224/264 |
| 2006/0144400 A1* | 7/2006 | Grassi | A62B 25/00 | 224/262 |

(Continued)

*Primary Examiner* — Adam J Waggenspack

(74) *Attorney, Agent, or Firm* — McGlew and Tuttle, P.C.

(57) ABSTRACT

A padding device (10*a;* 10*b;* 10*c;* 10*d;* 10*e*), for a carrying belt system (100) for a respirator (1000), has a closed pad core shell (20) and a pad core (30) configured in the pad core shell. The padding device is formed by injection molding a hollow profiled section, inserting of a pad core material into the hollow profiled section for forming the pad core in the hollow profiled section, and closing the hollow profiled section (21) for creating the closed pad core shell (20). The padding device (10*a;* 10*b;* 10*c;* 10*d;* 10*e*) has a closed pad core shell (20) and a pad core (30) arranged in the pad core shell. The pad core shell is seamless as an injection-molded component in at least some sections. A carrying belt system and a respirator with the carrying belt system are provided with the belt system having the padding device.

10 Claims, 6 Drawing Sheets

(51) Int. Cl.

| | |
|---|---|
| ***B29C 45/14*** | (2006.01) |
| ***B29C 57/10*** | (2006.01) |
| ***B29C 71/02*** | (2006.01) |
| *B29L 31/58* | (2006.01) |
| *B29C 44/08* | (2006.01) |
| *B29L 22/00* | (2006.01) |
| *B29K 67/00* | (2006.01) |
| *B29K 75/00* | (2006.01) |
| *B29K 105/04* | (2006.01) |
| *B29L 9/00* | (2006.01) |

(56) References Cited

U.S. PATENT DOCUMENTS

2011/0174310 A1* 7/2011 Burz .................. B29C 45/4407
425/577
2013/0206806 A1* 8/2013 Hu .......................... A45F 3/005
224/660

* cited by examiner

DEVICE FOR A CARRYING BELT SYSTEM FOR A RESPIRATOR, PADDING DEVICE, CARRYING BELT SYSTEM AND RESPIRATOR

CROSS REFERENCE TO RELATED APPLICATIONS

This is a divisional application and claims the benefit of priority under 35 U.S.C. § 120 of U.S. patent application Ser. No. 15/477,305, filed Apr. 3, 2017, which claims the benefit of priority under 35 U.S.C. § 119 of German Patent Application 10 2016 004 311.3, filed Apr. 12, 2016, the entire contents of which are incorporated herein by reference.

FIELD OF THE INVENTION

The present invention pertains to a process for manufacturing a padding device for a carrying strap system (also known as a carrying belt system, such as a harness system) for a respirator. The present invention further pertains to a padding device for a carrying belt (strap) system for a respirator, having a closed pad core shell and a pad core arranged in the pad core shell. In addition, the present invention pertains to a carrying belt system as well as to a respirator with the carrying belt system, the carrying belt system having the padding device.

BACKGROUND OF THE INVENTION

Padding devices and carrying belt systems for respirators are known in the state of the art. Carrying belt systems for respirators have to have a high resistance, because they are exposed to the highest stresses, for example, in firefighting operations. Nevertheless, such carrying belt systems shall be comfortable for the user to wear even for several hours. In addition, it is desirable that such carrying belt systems be simple to handle, i.e., that they can be put on and be taken off quickly and in an uncomplicated manner.

To ensure carrying comfort, padding devices, which have a textile, sewn shell, which enclose an elastic core, especially a foam core, are known in the state of the art. For a higher resistance against fire, such textile shells are as a rule manufactured from flame-retardant materials. In addition, there are configurations, in which the textile shell is provided with a moisture barrier on the inside thereof in order to reduce the penetration of water. Such a padding device is attached directly to a pull strap of a carrying belt by means of locks. An advantage of such padding devices is that they are simple to manufacture. In addition, it has been found that carrying belts equipped with textile padding devices are indeed relatively comfortable to wear. However, as one drawback, it was found that the moisture barrier is damaged by the sewing of the shell, as a result of which moisture can penetrate between the elastic core and the textile shell. Consequently, the drying process for this type of padding device or for the corresponding carrying belt lasts for a relatively long time. In the case of a contamination, it is further not possible or only possible with extreme difficulty to remove all harmful substances without residues from an area between the elastic core and the textile shell.

Further, carrying belt systems are known in the state of the art, in which thermoformed, elastomer-coated parts are brought together with a foam in a mold, wherein a pull strap is located on the inside that is connected to a connection clip and thus transmits force to a pull strap located on the outside. The pull strap located on the inside, the pull strap located on the outside as well as the connection clip are or become sewn together with an outer seam. The pull strap located on the inside, the pull strap located on the outside as well as the connection clip are in this case enclosed by a rubberized outer shell. Such a configuration is relatively robust. Such padding devices or corresponding carrying devices have, however, a complicated configuration consisting of many individual parts. Many process steps are also needed to manufacture such a padding device and the corresponding carrying device.

SUMMARY OF THE INVENTION

An object of the present invention is to eliminate at least some of the above-described drawbacks in carrying belt systems. In particular, an object of the present invention is to provide a process for the simple and cost-effective manufacture of a padding device for a carrying belt system for a respirator, as well as a padding device having a correspondingly simple and cost-effective configuration and a corresponding carrying belt system as well as a respirator with the padding device.

The above-mentioned object is accomplished by a process according to the invention, by a padding device according to the invention, by a carrying belt system according to the invention, as well as by a respirator according to the invention. Features and details, which are described in connection with the process according to the present invention, also apply of course, in connection with the padding device, the carrying belt system, the respirator according to the present invention and vice versa, so that reference is or may always be made mutually to the individual aspects of the present invention in relation to the disclosure.

According to a first aspect of the present invention, the object is accomplished by a process for manufacturing a padding device for a carrying belt system for a respirator, the padding device having a closed pad core shell and a pad core formed in the pad core shell. In this case, the process has the following steps:

- injection molding of a hollow profiled section,
- insertion of a pad core material into the hollow profiled section for forming a pad core in the hollow profiled section, and
- closing of the hollow profiled section for creating the closed pad core shell.

These steps are preferably carried out in the sequence listed above.

It is possible by means of the present process to manufacture the padding device in an especially simple and fast manner. In particular, the injection molding of the hollow profiled section is a process step that can be carried out in a simple manner in an especially short time. The padding device is manufactured according to the invention seamlessly, as a seamless structure—configured as a seamless pad core shell—, i.e., a step of sewing up of various individual parts of the padding device can be dispensed with. As a result, not only time, but also corresponding costs can be saved. In addition, it is possible due to the injection molding to create, in principle, any desired shapes of the hollow profiled section. Thus, hollow profiled section shapes that are suitable for a padding device and a carrying belt system with a high carrying comfort can be created in an especially simple manner.

In the present case, the padding device for the carrying belt system for the respirator is especially defined as a padding device, which is suitable for firefighting operations, i.e., the padding device preferably has a certain resistance against fire and heat. Respirator is defined here especially as a compressed air respirator for firefighting and rescue operations as well as a closed-circuit respirator in the broadest sense.

The closed pad core shell is defined in the sense of the present invention as a fully closed, and especially hermetically sealed or essentially hermetically sealed shell, which shields the pad core from a surrounding area in the manner of a housing. The pad core shell is processed or manufactured as a seamless structure according to the invention. The pad core shell is preferably closed in a liquidtight manner (the pad core shell forms a liquid impermeable barrier) and possibly also in a gastight manner (the pad core shell forms a gas impermeable barrier), i.e., the pad core shell encloses the pad core in a liquidtight manner (liquidtight) and possibly also in a gastight manner (gastight).

In the present case the injection molding is preferably carried out as an elastomer injection molding. The hollow profiled section is hereby manufactured from at least one elastomer, i.e., the hollow profiled section comprises at least one elastomer. In the present case the hollow profiled section as well as the closed pad core shell are preferably manufactured as a one-piece and/or monolithic component. Time-consuming and correspondingly cost-intensive intermediate steps in case of the manufacture of the hollow profiled section and of the pad core shell can hereby be avoided.

The pad core material is preferably inserted into the hollow profiled section as foam material, for example, polyester foam material and/or PU foam material. Here, the hollow profiled section is defined as a hollow profiled section, which has an opening on at least one side. An open profiled section is preferably used in at least some sections. The hollow profiled section can be injection molded, for example, as a chamber-like or tubular hollow profiled section. The closing of the hollow profiled section for creating the closed pad core shell can be carried out mechanically or chemically. Thus, it is, for example, possible that the hollow profiled section is closed by pressing, crimping or riveting the at least one open side of the hollow profiled section. It is further possible that the hollow profiled section or the at least one open point or side of the hollow profiled section is closed by adding another material in the area of the at least one open side of the hollow profiled section. As an alternative or in addition, it is possible that the hollow profiled section or the at least one open side of the hollow profiled section is closed by a chemical treatment of the hollow profiled section and/or of the pad core material.

According to a variant of the present invention, it is possible that in a process, the hollow profiled section is arranged in a negative mold after injection molding and remains arranged in the negative mold from the time of insertion of the pad core material until after closing the hollow profiled section, i.e., the hollow profiled section remains in the same negative mold until the closing of same or until the finishing of the padding device in same. As a result, the padding device can be manufactured in an especially fast, simple and correspondingly cost-saving manner. In principle, it is also possible here that the injection molding of the hollow profiled section is already carried out in the negative mold. In this case, it is further possible that the hollow profiled section remains arranged in the negative mold from the time of its finishing by injection molding until closing of the hollow profiled section or until finishing of the padding device. The negative mold is defined as a mold, into which the hollow profiled section can be inserted or is inserted in a positive-locking manner in at least some sections, i.e., an inner side of the mold has a shape complementary to an outer surface of the hollow profiled section in at least some sections.

Further, it is possible according to the present invention that the hollow profiled section, in which the pad core material is located, is closed by vulcanizing the hollow profiled section and/or the pad core material in at least one open edge area of the hollow profiled section in a process. The hollow profiled section can be closed by means of vulcanizing in an especially material-saving and correspondingly cost-effective manner. The hollow profiled section can be closed here through the influence of defined time, temperature and pressure. It may be advantageous here when, during the vulcanization, vulcanization accelerators are used, by means of which the hollow profiled section can be closed faster and the padding device can be manufactured correspondingly faster. As vulcanization accelerators, dithiocarbamates, thiuram disulfides and monosulfides, xanthogenates and/or mercaptobenzothiazole, for example, can be used.

In addition, it is possible according to the present invention that in a process, a belt strap connection device (a strap connection device) for establishing an operative connection with a belt strap of the carrying belt system (a carrying strap system) is configured at the hollow profiled section, especially as an integral component of the hollow profiled section, during the injection molding of the hollow profiled section. Here, the belt strap connection device is preferably configured as seamless at the hollow profiled section. Preferably, the belt strap connection device is formed during the injection molding of the hollow profiled section. A later fixing of a belt strap connection device to the hollow profiled section or to the pad core shell, for which a separate process step would be necessary, can consequently be dispensed with. Time and costs can be saved as a result. An integral and/or monolithic connection or a connection in substance between the hollow profiled section and the belt strap connection device is, in addition, more robust than a connection that is established, for example, by a seam or sewing up. In addition, the padding device is better, i.e., simpler and faster to clean in the case of an integral connection and/or a monolithic connection or connection in substance between the hollow profiled section and the belt strap connection device compared to a connection by means of seam or sewing up. In the present case, operative connection is especially defined as an operative connection between the belt strap and the pad core shell or the padding device.

Within the scope of the present invention, the pad core material may be injected into the hollow profiled section by means of an injection device in a process. By injecting the pad core material by means of an injection device, the hollow profiled section can be filled with the pad core material in an especially fast, accurate and automated manner. An injector in the form of an injection nozzle can be provided as an injection device.

According to a second aspect of the present invention a padding device for a carrying belt system for a respirator is provided. The padding device has a closed pad core shell and a pad core arranged in the pad core shell. The pad core shell is configured here as a seamless, injection-molded component in at least some sections. Such a padding device offers the same advantages, as they were described in detail with reference to the device according to the present invention. For this purpose, it is preferred that the padding device be manufactured according to a process as described above. In case of such a padding device, the pad core shell seals off the pad core in an especially liquidtight and/or gastight manner.

As a result, a decontamination as well as, in general, a cleaning of the padding device can be carried out in an especially simple manner. Moreover, a drying of the padding device can take place in a minimum of time because of the pad core shell configured as a seamless, injection-molded component.

The pad core shell preferably comprises an elastomer, for example, an ethylene propylene diene monomer (EPDM) rubber, or consists of at least one elastomer. As a result, a high resistance to abrasion and a corresponding durability, fire resistance and heat resistance of the padding device can be achieved. Further, the pad core shell is configured as being seamless and as an injection-molded component in at least some sections. The pad core shell here preferably has a one-piece and/or monolithic configuration. Due to the one-piece and/or monolithic configuration, the pad core shell can enclose the pad core in a liquidtight manner and also in a gastight manner against a surrounding area in case of using corresponding materials. The liquidtight and possibly gastight enclosure of the pad core can especially be ensured by the seamless configuration. The pad core preferably comprises a foam material and/or is manufactured from same. The foam material may be, for example, a polyester foam material and/or a PU foam material.

According to a variant of the present invention, a belt strap connection device (a strap connection device) for establishing an operative connection with a belt strap (strap) of the carrying belt system (carrying strap system), may be configured on an outer side of the pad core shell of the padding device. As a result, it is possible in an especially simple manner to establish an operative connection between the pad core shell or the padding device and the belt strap of the carrying belt system. In the present case, an operative connection is defined especially as a positive-locking and/or frictional connection, which can be established between the padding device and the belt strap by the belt strap connection device in at least some sections.

Within the scope of the present invention, it may be advantageous when the belt strap connection device is configured as an integral component of the pad core shell in a padding device. As a result, the belt strap connection device is connected to the pad core shell in an especially secure and robust manner. The pad core shell and the belt strap connection device can, for this, be or are connected, for example, in substance and/or can be configured as a one-piece and/or monolithic component. In case of a connection in substance, the belt strap connection device can be bonded or welded to the pad core shell, for example.

Further, it is possible according to the present invention that in a padding device the pad core shell and the belt strap connection device together form at least one ring section, especially a closed ring section, for receiving the belt strap. Due to the ring section, i.e., a section having a ring-shaped configuration, the padding device can be securely connected to the belt strap and be provided for receiving the belt strap. After the belt strap has been threaded through the at least one ring section and subsequently closed, the padding device can no longer be detached from the belt strap. It is possible here that the padding device has a plurality of ring sections, which are each configured for receiving the belt strap. As a result, the padding device can be connected to the belt strap in an especially secure and/or material-saving manner and be provided for receiving the belt strap.

In addition, it is possible according to the present invention that in case of a padding device, the pad core shell and the belt strap connection device together form at least one C-shaped section for receiving the belt strap. Due to the at least one C-shaped section, the padding device can be connected to the belt strap in an especially simple manner, i.e., the belt strap can be received in the C-shaped section in an especially simple manner. Preferably two C-shaped sections are provided, the open ends of which are facing one another. The pad core shell and the belt strap connection device form the C shape at least in a cross section through the pad core shell and the belt strap connection device.

In addition, it may be advantageous within the scope of the present invention when in a padding device at least one section of the belt strap connection device extends over at least 50%, especially at least 80%, of the length of the pad core shell. As a result, during use, the padding device can be loaded by the belt strap or a corresponding force can be applied especially uniformly over the entire padding device or at least the predominant area of the padding device. The length of the pad core shell is defined as a length of the longest side of the pad core shell.

In addition, it may be advantageous, within the scope of the present invention, when the belt strap connection device comprises at least one locking projection, especially at least one stepped and/or undercut locking projection, for locking the belt strap in a defined position at the pad core shell. Due to the locking projection, the belt strap, which has at least one corresponding passage hole, can be fixed to the pad core shell or to the padding device in an especially simple, fast and secure manner. For a good hold of the belt strap at the pad core shell, the locking projection may have, for example, a mushroom-shaped configuration. In addition, the belt strap can be pulled over the locking projection in an especially easy and nondestructive manner due to a mushroom head of the locking device. The undercutting here does not have to have a stepped configuration, but may also have a continuous configuration.

It may be further advantageous when in a padding device according to the present invention, the at least one locking projection has a blind hole, especially a stepped and/or undercut blind hole, for receiving a locking pin. After the belt strap, which has at least one corresponding passage hole, has been pulled over the locking projection, the locking projection can then easily be extended radially outwards, preferably elastically, by inserting the locking pin into the blind hole, as a result of which the belt strap can be connected especially permanently to the pad core shell or to the padding device. For this, the blind hole preferably has at least one convex or concave inner surface, which is configured complementarily to an outer surface of the locking pin having a correspondingly convex or concave configuration.

In a variant of the present invention, in case of a padding device, the pad core shell may have a plurality of pad core chambers, wherein a pad core is formed in each of the pad core chambers. As a result, the padding device may have a configuration which is especially flexible and correspondingly comfortable to wear.

According to a third aspect of the present invention, a carrying strap system (carrying belt system) for a respirator is provided, the carrying belt system comprising a padding device as described above. Thus, the carrying belt system according to the present invention offers the same advantages, as they have been described in detail with reference to the padding device according to the present invention.

According to yet another aspect of the present invention, a respirator with the above carrying belt system according to the third aspect of the present invention is provided. The respirator according to the present invention thus also offers the same advantages, as they have been described in detail with reference to the padding device according to the present invention according to the second aspect of the present invention.

Other features improving the present invention appear from the following description of various exemplary embodiments of the present invention, which are shown schematically in the figures. All features and/or advantages, including structural details and spatial arrangements appearing from the claims, the description or the drawings, may be essential to the present invention both in themselves and in the various combinations.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
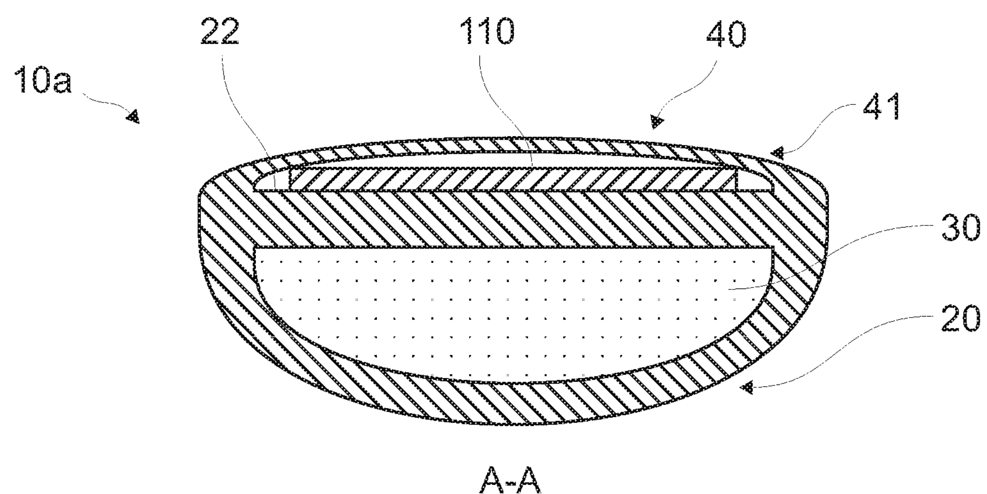
FIG. 1 is a sectional view of a padding device according to a first embodiment of the present invention.
Figure 2:
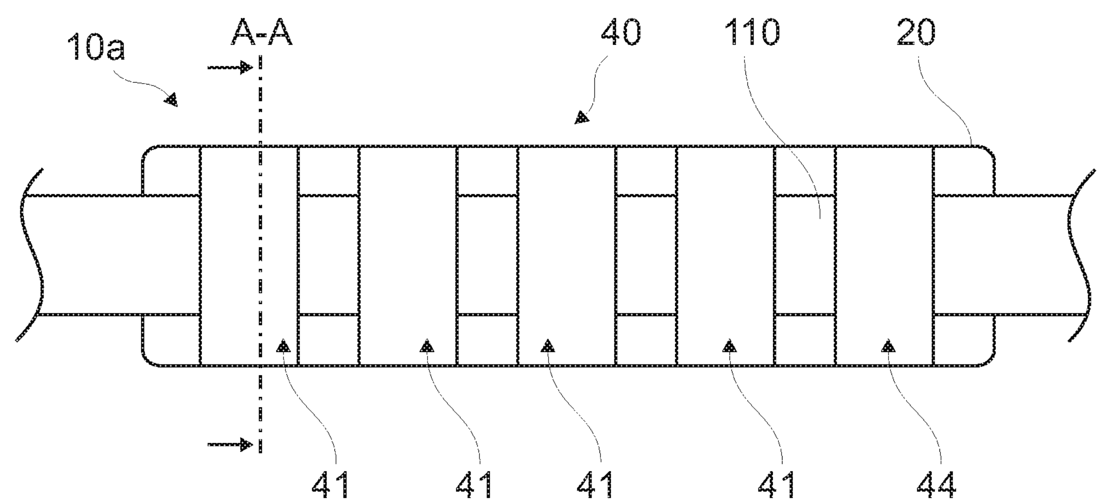
FIG. 2 is a top view of the padding device shown in FIG. 1.

Referring to the drawings, components having an identical function and mode of operation are each provided with the same reference numbers in FIGS. 1 through 14.

FIG. 1 shows a sectional view of a padding device 10*a* for a carrying belt system 100 according to a first embodiment. The padding device 10*a* has a closed pad core shell 20 and a pad core 30 arranged in the pad core shell 20. The pad core shell 20 shown in FIG. 1 is configured as a seamless, injection-molded component. A belt strap connection device 40 is connected in one piece to the pad core shell 20 according to FIG. 1, i.e., the belt strap connection device 40 is configured as an integral component of the pad core shell 20. The belt strap connection device 40 and the pad core shell 20 together form a ring section 41, through which a belt strap 110 runs and in which the belt strap 110 is arranged. The belt strap connection device 40 is provided on an outer side 22 of the pad core shell 20 according to FIG. 1. This is shown in a top view in FIG. 2 for a better understanding of the padding device 10*a*.

Figure 3:
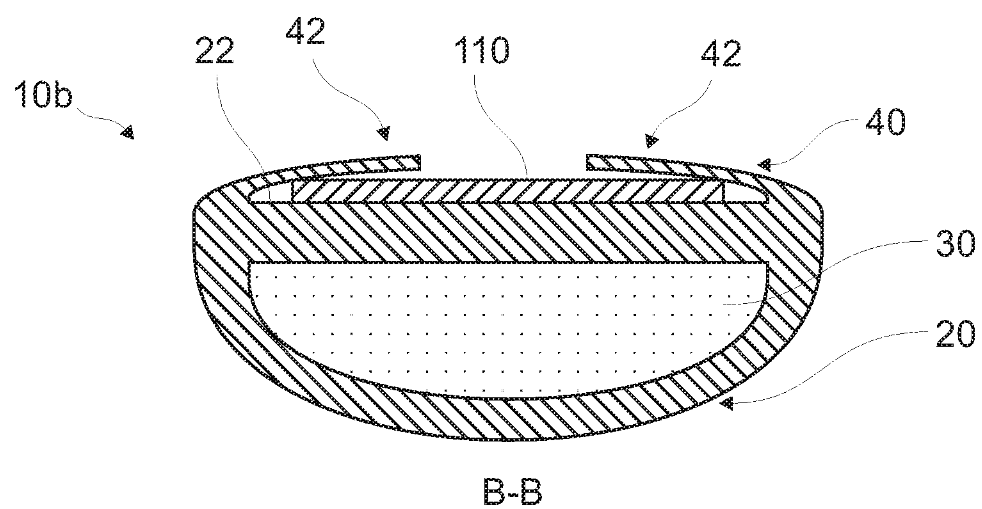
FIG. 3 is a sectional view of a padding device according to a second embodiment of the present invention.
Figure 4:
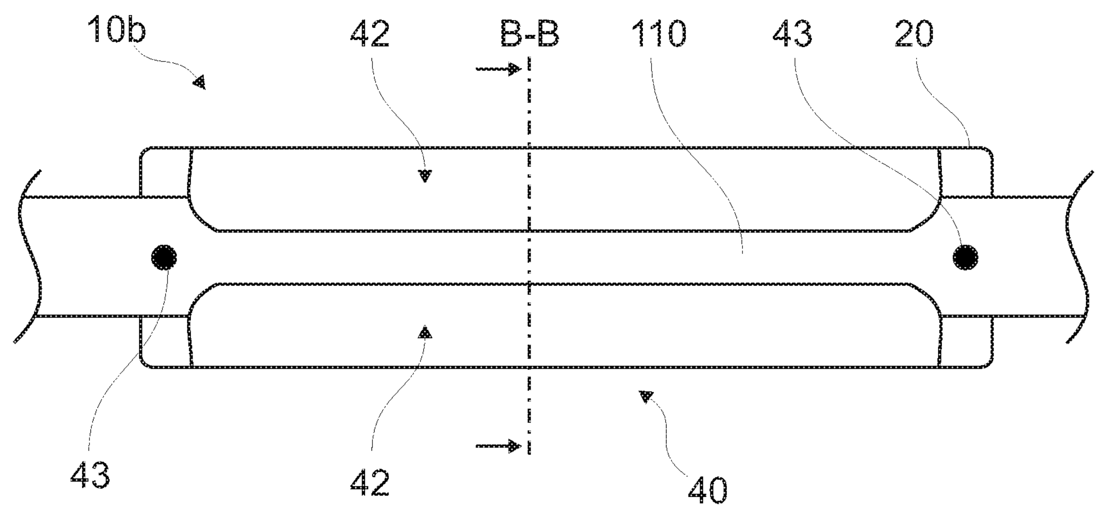
FIG. 4 is a top view of the padding device shown in FIG. 3.

FIG. 3 shows a sectional view of a padding device 10*b* for a carrying belt system 100 according to a second embodiment. The padding device 10*b* according to the second embodiment especially differs from the padding device 10*a* according to the first embodiment in that the belt strap connection device 40 and the pad core shell 20 together form two C-shaped sections 42 for receiving the belt strap 110. This is shown in a top view in FIG. 4 for a better understanding of the padding device 10*b*. In the top view, rivets 43 are further shown, by means of which the belt strap 110 is fixed to the pad core shell 20 or to the padding device 10*b* for a better hold. As appears, in addition, from FIG. 4, the two C-shaped sections 42 extend over more than 80% of the length of the pad core shell 20.

Figure 5:
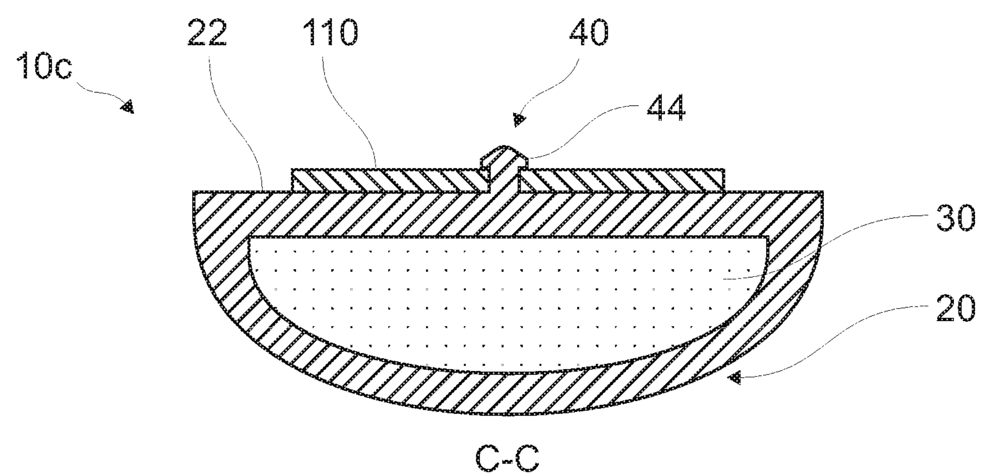
FIG. 5 is a sectional view of a padding device according to a third embodiment of the present invention.
Figure 6:
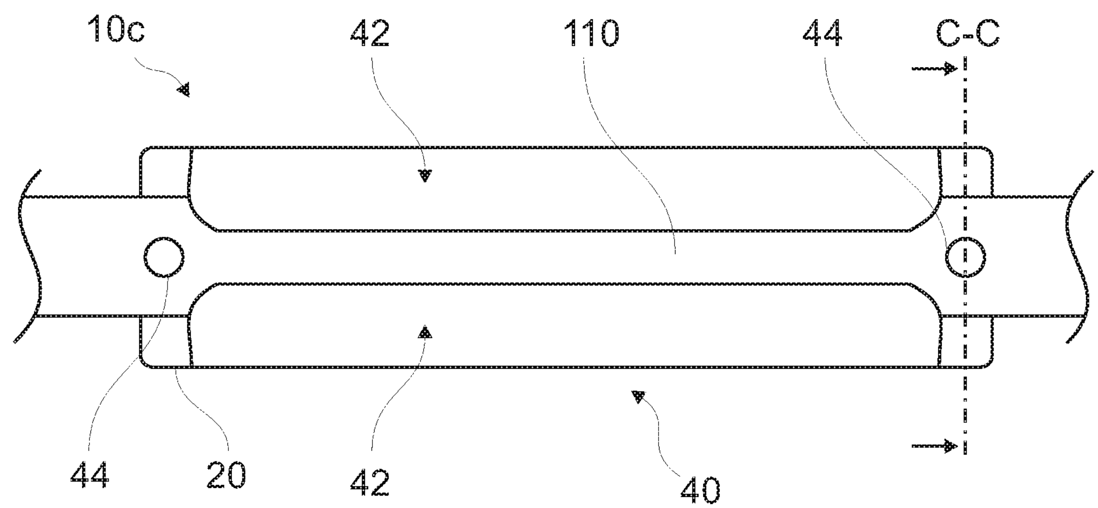
FIG. 6 is a top view of the padding device shown in FIG. 5.

FIG. 5 shows a sectional view of a padding device 10*c* for a carrying belt system 100 according to a third embodiment. The padding device 10*c* according to a third embodiment especially differs from the padding device 10*a* according to the first embodiment in that the belt strap connection device 40 has two stepped and undercut, and more precisely mushroom-shaped locking projections 44, for locking the belt strap 110 in a defined position at the pad core shell 20. This is shown in a top view in FIG. 6 for a better understanding of the padding device 10*c*.

Figure 7:
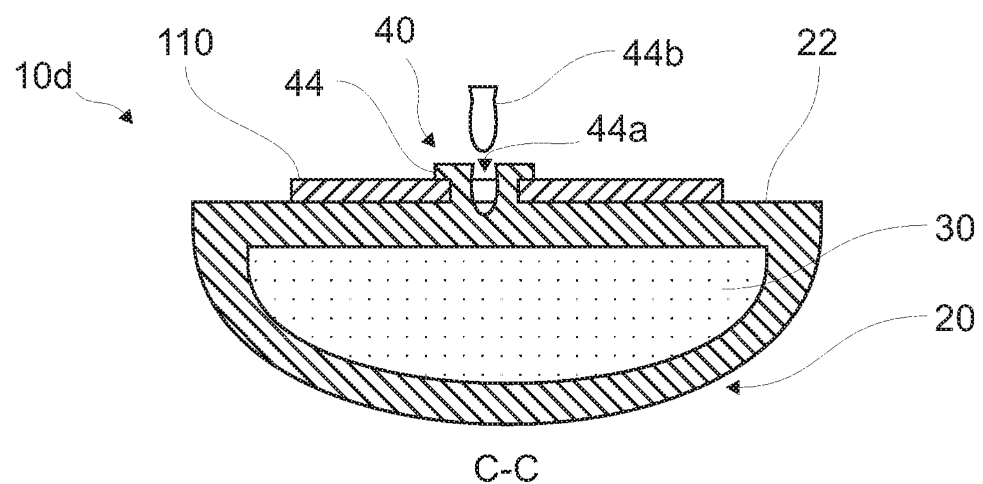
FIG. 7 is a sectional view of a padding device according to a fourth embodiment of the present invention.
Figure 8:
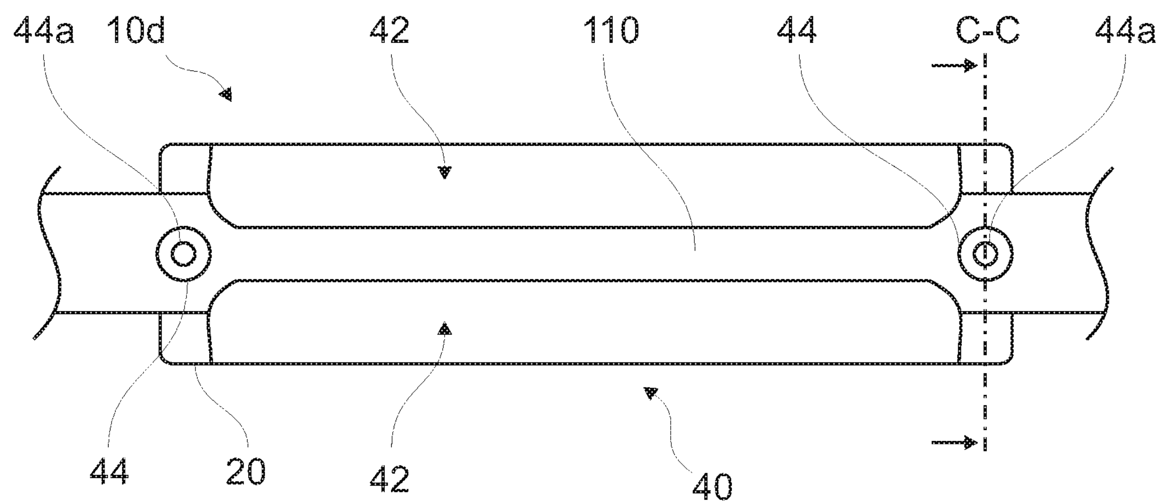
FIG. 8 is a top view of the padding device shown in FIG. 7.

FIG. 7 shows a padding device 10*d* for a carrying belt system 100 according to a fourth embodiment. The padding device 10*d* according to the fourth embodiment especially differs from the padding device 10*a* according to the first embodiment in that two locking projections 44 have each a continuously undercut blind hole 44*a* for receiving a locking pin 44*b*. By inserting the locking pin 44*b* into the blind hole 44*a*, after the belt strap 110 has been pulled over the corresponding locking projection 44, the belt strap 110 can be securely fixed to the padding device 10*d*. This is shown in a top view in FIG. 8 for a better understanding of the padding device 10*d*.

Figure 9:
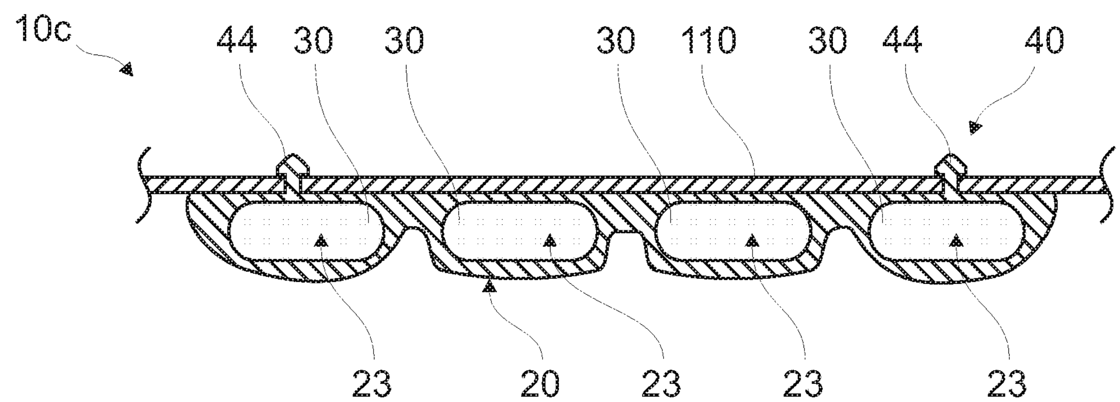
FIG. 9 is another sectional view of a padding device according to the third embodiment of the present invention.

FIG. 9 shows the padding device 10*c* according to the third embodiment in another sectional view. As shown in FIG. 9, the pad core shell 20 has a plurality of pad core chambers 23, wherein a pad core 30 is configured in each of the pad core chambers 23.

Figure 10:
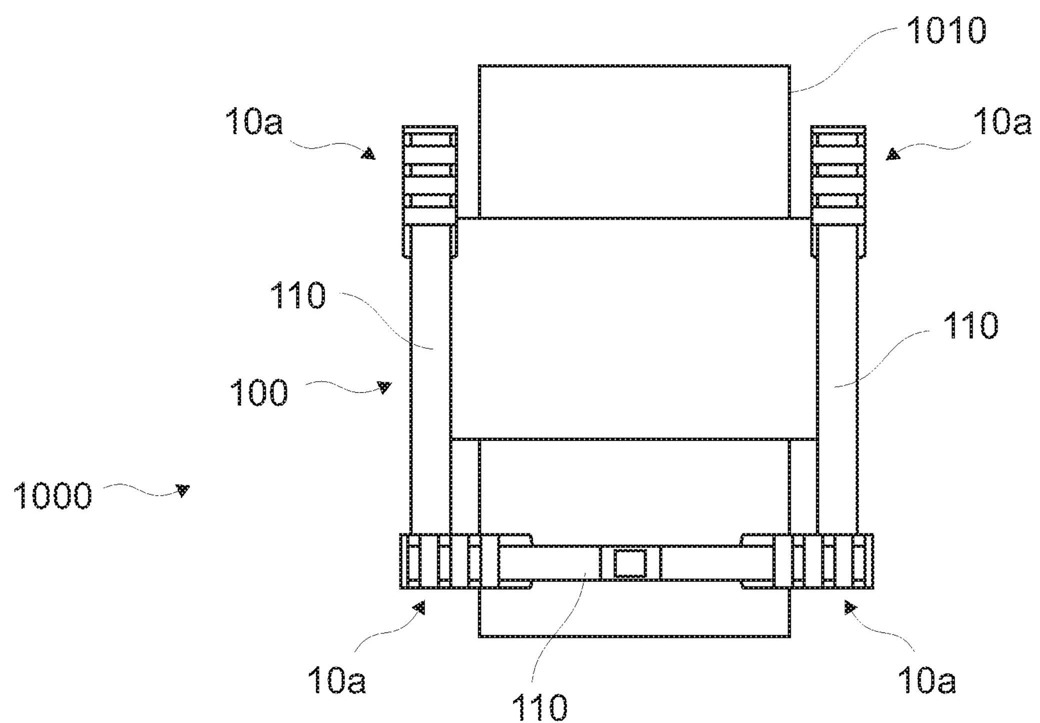
FIG. 10 is a respirator according to the present invention with a carrying belt system according to the present invention.

FIG. 10 shows a respirator 1000 with a carrying belt system 100. The respirator 1000 further has a respirator functional unit rear part 1010, on which or to which functional units of the respirator 1000 can be mounted. The respirator 1000 shown in FIG. 10 has four padding devices 10*a*. The respirator 1000 shown in FIG. 10 represents a closed-circuit respirator.

Subsequently, a process for manufacturing a padding device 10*e* according to a fifth embodiment is described with reference to FIGS. 11 through 14. The padding device 10*e* according to the fifth embodiment represents an especially simple manner of configuration of a padding device according to the present invention.

Figure 11:
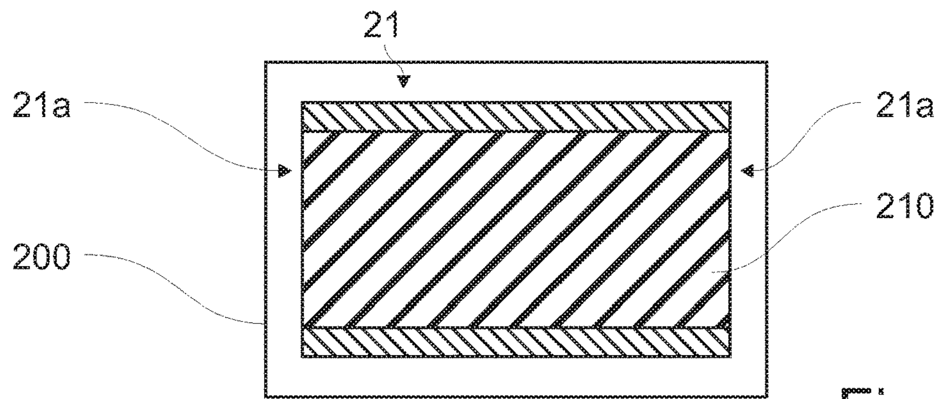
FIG. 11 is a schematic view showing a process step of a process for manufacturing a padding device according to a fifth embodiment of the present invention.
Figure 12:
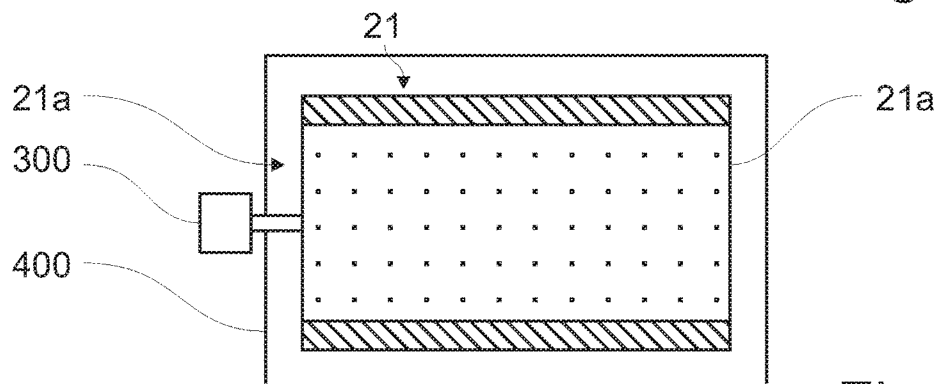
FIG. 12 is a schematic view showing another process state of the process for manufacturing the padding device according to the fifth embodiment of the present invention.
Figure 13:
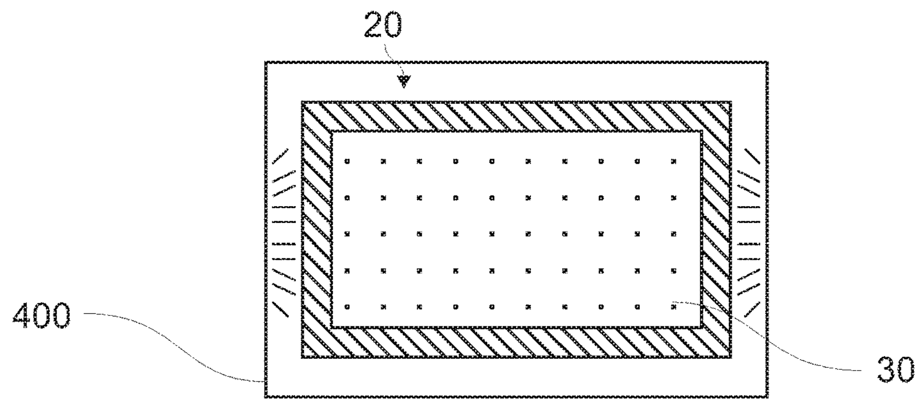
FIG. 13 is a schematic view showing another process state of the process for manufacturing the padding device according to the fifth embodiment of the present invention.
Figure 14:
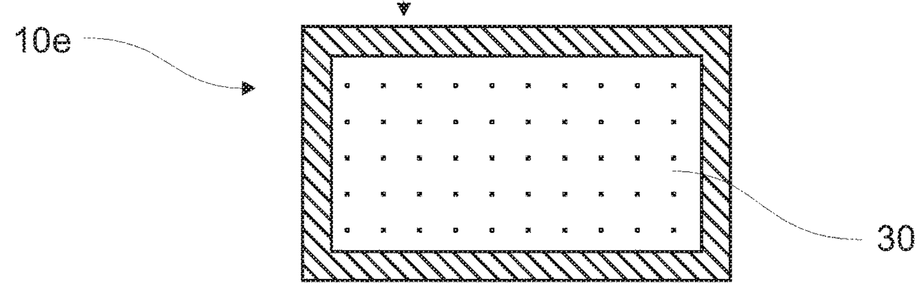
FIG. 14 is a schematic view showing another process state of the process for manufacturing the padding device according to the fifth embodiment of the present invention.

According to the process shown in FIGS. 11 through 14, in a first step, which is especially shown in FIG. 11, an open hollow profiled section 21 is manufactured by injection molding in a mold 200, which has a mold core 210. In a next step, which is especially shown in FIG. 12, the hollow profiled section 21 is arranged in a negative mold 400. In the negative mold 400, pad core material is now inserted into the hollow profiled section 21 by an injection device 300 in the form of an injector in order to form a pad core 30 therein. In a next step, which is especially shown in FIG. 13, the hollow profiled section 21 is closed for creating a closed pad core shell 20 by vulcanizing the hollow profiled section 21 and the pad core material in the two open edge areas 21*a* of the hollow profiled section 21. The hollow profiled section 21 remains arranged in the negative mold 400 from the time of inserting the pad core material 30 until after closing the hollow profiled section 21. In a next step, which is shown by FIG. 14, the finished padding device 10*e* can be removed from the negative mold. A mold-based manufacture of a seamless pad core shell by means of the present process is possible in only one process step.

In addition to the embodiments shown, the present invention allows other configuration principles. Thus, it is, for example, possible that the mold 200 and the negative mold 400 represent the same mold, i.e., the padding device 10*e* would, in this case, not have to be removed from the mold during the manufacture of same. Further, it is possible to manufacture the hollow profiled section with only one opened side or more than two opened sides by means of the present process and then to close the hollow profiled section as described above.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 10b, 10c, 10d, 10e | Padding device |
| 20 | Pad core shell |
| 21 | Hollow profiled section |
| 21a | Open edge area |
| 22 | Outer side |
| 23 | Pad core chamber |
| 30 | Pad core |
| 40 | Belt strap connection device |
| 41 | Ring segment |
| 42 | C-shaped section |
| 43 | Rivet |
| 44 | Locking projection |
| 44a | Blind hole |
| 44b | Pin |
| 100 | Carrying belt system |
| 110 | Belt strap |
| 200 | Mold |
| 210 | Mold core |
| 300 | Injector |
| 400 | Negative mold |
| 1000 | Respirator |
| 1010 | Rear part |

What is claimed is:

1. A respirator carrying strap system comprising:

a padding device comprising:

a pad core formed of a pad core material; and a closed pad core shell formed by injection molding of a hollow profiled section with a strap connection device, wherein the strap connection device is formed at the hollow profiled section, as an integral component of the hollow profiled section, the pad core material is inserted into the hollow profiled section during the injection molding of the hollow profiled section to form the pad core in the hollow profiled section and the hollow profiled section is closed to create the closed pad core shell fully surrounding and sealing off the pad core, within the pad core shell, from an exterior of the closed pad core shell; and a strap connected to the strap connection device for wearing over a user's shoulder or around a user's torso or both over a user's shoulder and around a user's torso for carrying a respirator.

2. A respirator carrying strap system in accordance with claim 1, wherein the closed pad core shell and the strap connection device together form at least one ring section for receiving the strap.

3. A respirator carrying strap system in accordance with claim 1, wherein the closed pad core shell and the strap connection device together form at least one C-shaped section for receiving the strap.

4. A respirator carrying strap system in accordance with claim 1, wherein at least one section of the strap connection device extends over at least 50% of a length of the pad core shell.

5. A respirator carrying strap system in accordance with claim 1, wherein the strap connection device comprises at least one locking projection comprising at least one stepped locking projection or undercut locking projection or both stepped and undercut locking projection, for locking the strap in a defined position at the closed pad core shell.

6. A respirator carrying strap system in accordance with claim 1, wherein the strap connection device comprises at least one locking projection comprising a blind hole comprising a stepped blind hole or an undercut blind hole or a stepped blind and undercut blind hole, for receiving a locking pin.

7. A respirator carrying strap system in accordance with claim 1, wherein the padding device further comprises another pad core formed of pad core material, wherein the closed pad core shell formed by injection molding has another hollow profiled section and the pad core material of the other pad core is inserted the into the other hollow profiled section during the injection molding of the other hollow profiled section for forming the other pad core in the other hollow profiled section and the other hollow profiled section is closed to create the closed pad core shell fully surrounding and sealing off the other pad core, within the closed pad core shell, from an exterior of the closed pad core shell, whereby the closed pad core shell has a plurality of pad core chambers and the pad core is configured in one of the pad core chambers and the other pad core is configured in another of the pad core chambers.

8. A respirator carrying strap system according to claim 1, in combination with a respirator functional unit to form a respirator, wherein the respirator functional unit is connected to the carrying system.

9. A respirator carrying strap system in accordance with claim 8, further comprising a respirator functional unit rear part connected to the carrying system, wherein the respirator functional unit is mounted to the functional unit rear part.

10. A respirator carrying strap system in accordance with claim 8, wherein the respirator functional unit is or forms a part of the respirator and the respirator is a closed-circuit respirator.

* * * * *